United States Patent

Van de Kerkhof

[11] Patent Number: 5,995,493
[45] Date of Patent: Nov. 30, 1999

[54] TRANSMISSION OF A DIGITAL INFORMATION SIGNAL HAVING A SPECIFIC FIRST SAMPLING FREQUENCY

[76] Inventor: Leon M. Van de Kerkhof, Groenewoudseweg 1, 5621 BA Eindhoven, Netherlands

[21] Appl. No.: 08/852,761

[22] Filed: May 7, 1997

[30] Foreign Application Priority Data

May 8, 1996 [EP] European Pat. Off. ............. 96201261

[51] Int. Cl.$^6$ ............. H04B 3/20; H04B 15/00; H04L 27/04; H04L 7/00
[52] U.S. Cl. ............. 370/286; 375/296; 375/355; 375/346; 375/285
[58] Field of Search ............. 370/286, 289, 370/290, 291, 477, 480; 375/295, 296, 285, 232, 316, 350, 355; 379/406, 410, 411; 364/724.13; 704/724.19

[56] References Cited

U.S. PATENT DOCUMENTS

| | | | |
|---|---|---|---|
| 4,468,794 | 8/1984 | Waters et al. | 370/210 |
| 4,995,057 | 2/1991 | Chung | 375/231 |
| 5,504,785 | 4/1996 | Becker et al. | 375/350 |
| 5,577,027 | 11/1996 | Cheng | 370/286 |
| 5,583,887 | 12/1996 | Murata et al. | 375/295 |
| 5,612,975 | 3/1997 | Becker et al. | 375/350 |

*Primary Examiner*—Alpus H. Hsu
*Assistant Examiner*—Afsar M. Qureshi
*Attorney, Agent, or Firm*—Michael E Bell

[57] ABSTRACT

A transmitter is disclosed for transmitting a digital information signal having a specific first sampling frequency ($f_{s1}$) via a transmission medium. The digital information signal is lowpass filtered (10) and down sampled (12) so as to obtain a low frequency component of the digital information signal. This signal is transmitted via the transmission medium (TRM). Further the low frequency component is upsampled (22) and filtered (28) and subsequently subtracted (34) from the original digital information signal. The difference signal thus obtained is also transmitted.

24 Claims, 3 Drawing Sheets

TRANSMISSION OF A DIGITAL INFORMATION SIGNAL HAVING A SPECIFIC FIRST SAMPLING FREQUENCY

BACKGROUND OF THE INVENTION

The invention relates to a transmitter for transmitting a digital information signal having a specific first sampling frequency, to a receiver for receiving a transmission signal from a transmission medium and generating a digital information signal therefrom, to a record carrier obtained with the transmitter, when in the form of an apparatus for recording information on a record carrier, and to a transmission method.

Prior art transmitters aim at transmitting a digital information signal having a specific second sampling frequency which is smaller than the first sampling frequency mentioned above. Corresponding receivers are capable of retrieving the digital information signal having the second sampling frequency from the transmission signal and to supply the signal to an output, eg. for reproduction via one or more loudspeakers.

SUMMARY OF THE INVENTION

The invention aims at providing an extension to the format of the transmission signal, so that transmission of a digital information signal of the first sampling frequency is possible, whilst prior art receivers are still capable of receiving and processing the digital information signal with the second sampling frequency.

The transmitter in accordance with the invention comprises input means for receiving the digital information signal having the specific first sampling frequency, first filter means for lowpass filtering and downsampling the digital information signal, so as to obtain a lowpass filtered version of the digital information signal, having a specific second sampling frequency which is smaller than the first sampling frequency, second filter means for carrying out a signal processing on the digital information signal which is equivalent to the signal processing carried out on the digital information signal by the first filter means, followed by upsampling the lowpass filtered version of the digital information signal having the specific second sampling frequency, so as to obtain an upsampled version of the digital information signal having a specific third sampling frequency which is substantially equal to the first sampling frequency, third filter means for carrying out a filtering on the upsampled version of the digital information signal so as to obtain a second filtered version of the digital information signal, first signal combination means for combining the digital information signal and the second filtered version of the digital information signal so as to obtain a difference signal, second signal combination means for combining the lowpass filtered version of the digital information signal and the difference signal so as to obtain a transmission signal for transmission via the transmission medium.

The receiver in accordance with the invention comprises retrieval means for retrieving the transmission signal from the transmission medium, demultiplexer means for deriving the lowpass filtered version of the digital information signal and the difference signal from the transmission signal, upsampling means for upsampling the lowpass filtered version of the digital information signal so as to obtain an upsampled version of the digital information signal having a specific third sampling frequency which is substantially equal to the first sampling frequency, filter means for carrying out a filtering on the upsampled version of the digital information signal so as to obtain a filtered version of the digital information signal, signal combination means for combining the filtered version of the digital information signal and the difference signal so as to obtain said digital information signal.

The invention is based on the following recognition. The transmitter in accordance with the invention lowpass filters and downsamples the digital information signal, which has the first sampling frequency (or sampling rate) of $f_{s1}$, so as to obtain a lowpass filtered and down sampled version of the digital information signal, which has the second sampling frequency of $f_{s2}$. $f_{s2}$ is smaller than $f_{s1}$. As an example, $f_{s2}$ could be chosen equal to $f_{s1}/2$. This lowpass filtered and downsampled signal is transmitted via the transmission medium, and can be received and processed by prior art receivers that are capable of receiving and processing a digital information signal having the second sampling frequency.

Further, the transmitter is provided with the second filter means. This second filter means are capable of carrying out a signal processing on the digital information signal which is equivalent to the signal processing carried out on the digital information signal by the first filter means, followed by upsampling the lowpass filtered version of the digital information signal having the specific second sampling frequency, so as to obtain an upsampled version of the digital information signal having a specific third sampling frequency which is substantially equal to the first sampling frequency. Some elements to realize this may be in common for the first and the second filter means.

The upsampled signal thus obtained is subsequently supplied to the third filter means so as to obtain the filtered signal. Dependent of the realisation of the third filter means, either a replica of the lowpass frequency component of the original digital information signal is generated or a signal is generated which more closely resembles the digital information signal itself. This signal is subsequently subtracted from the original digital information signal so as to obtain the difference signal. The data content of the difference signal is generally relatively small. Data compression may even be carried out on this difference signal so as to further decrease the data content. The difference is also transmitted via the transmission medium.

Receivers in accordance with the invention are capable of retrieving the two signal components transmitted and regenerate a replica of the digital information therefrom.

BRIEF DESCRIPTION OF THE DRAWINGS

These and other objects of the invention will become apparent from and elucidated further with reference to the embodiments described in the following figure description in which.

DESCRIPTION OF THE PREFERRED EMBODIMENT

Figure 1:
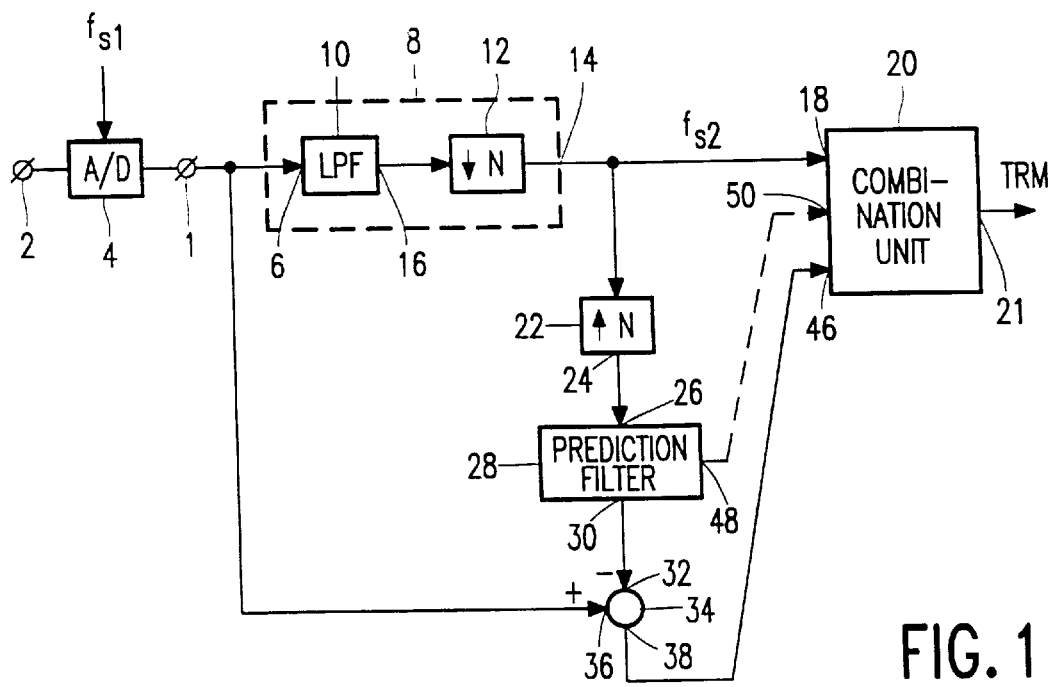
FIG. 1 shows a first embodiment of the transmitter.

FIG. 1 shows an embodiment of the transmitter. The transmitter has an input terminal 1 for receiving a digital information signal such as a wideband digital audio signal, sampled at a first sampling frequency $f_{s1}$. This digital information could have been obtained by supplying an analog version of the digital information signal having a bandwidth of $f_{s1}/2$ to an output 2 of an A/D converter 4. The A/D converter 4 samples the signal applied to its input 2 with a sampling frequency $f_{s1}$ and supplies the digitized samples to the input terminal 1 of the transmitter. The input terminal 1 is coupled to an input 6 of a lowpass filter and downsampling unit 8. The unit 8 comprises a lowpass filter 10, which has a cut off frequency of $f_p$ and a downsampler 12. The lowpass filter 10 filters the signal supplied to its input and passes the signal components below $f_p$ that are present in the signal to its output. The lowpass filtered signal still has a sampling frequency $f_{s1}$. The downsampler 12 deletes each time N−1 subsequent samples from subsequent groups of N subsequent samples in the signal supplied to its input and supplies the remaining samples to the output 14 of the unit 8. The output signal at the output 14 has a sampling frequency of $f_{s2}$, where $f_{s2}=f_{s1}/N$.

As an example, $f_{s1}$ could be chosen equal to 192 kHz and N=2, so that $f_{s2}$ to 96 kHz. Thus, $f_p$ should equal 48 kHz at the maximum, but a lower cut off frequency could equally well be chosen.

The lowpass filtered and downsampled signal present at the output 14 is supplied to an input 18 of a combination unit 20 as well as to an input of an upsampler 22, which upsamples the signal supplied to its input by a factor of N. That is: N zero amplitude samples are inserted between each two subsequent samples in the signal supplied to the input of the upsampler 22. The signal present at the output 24 of the upsampler 22 thus has the same sampling frequency as the original digital information signal. The output 24 of the upsampler 22 is coupled to the input 26 of a filter unit 28.

It should be noted here, that the circuit construction of the elements 10, 12 and 22 could have been realized in other ways. As one example, it is possible to reverse the order of the elements 10 and 12 in the filter unit 8. In another example, where the order of the elements 10 and 12 is in the way shown in FIG. 1, the upsampling unit 22 may be replaced by a unit which has its input coupled to the output 16 of the filter 10, and which sets each time N−1 subsequent samples in subsequent groups of N subsequent samples in the output signal of the filter 10, to a zero amplitude. This signal processing has the same effect as the series arrangement of the downsampler 12 and the upsampler 22.

An output 30 of the filter unit 28 is coupled to a first input 32 of a signal combination unit 34, which is in the present example in the form of a subtractor. A second input 36 of the combination unit 34 is coupled to the input terminal 1 of the transmitter. An output 38 of the combination unit 34 is coupled to an input 46 of the signal combination unit 20. The signal combination unit 20 combines the signals supplied to its inputs 18 en 46 into a serial data stream which is suitable for transmission via a transmission medium TRM. This signal combining step in the combination unit 20 may include a channel encoding step, well known in the art.

The filter unit 28 may be a fixed filter. The filter unit 28 could however also be in the form of an adaptive prediction filter, well known in the art. In that case, the filter unit 28 will generate prediction filter coefficients, which coefficients should be transmitted as well, in order to control a corresponding adaptive prediction filter in the transmitter, that will be described later. The filter unit 28, when in adaptive predictive form, also has an output 48 which is coupled to another input 50 of the combination unit 20, in order to supply the filter coefficients to the combination unit 20, for transmission of the coefficients via the transmission medium TRM.

The transmitter described above functions as follows. The digital information signal is supplied to the input terminal 1 with a sampling rate of $f_{s1}$ and is thus supplied to the lowpass filter unit 8 with a rate of $f_{s1}$ samples per second. $f_{s1}$ is assumed to be equal to 192 kHz, in this example. The lowpass filter 10 has a cut off frequency $f_p$ which is assumed to be equal to 48 kHz as a maximum. The lowpass filter 10 thus filters out the low frequency component of the digital information signal and supplies this low pass filtered version to the downsampler 12 with a rate of $f_{s1}$ samples per second. The downsampler 12 is assumed to downsample the signal applied to its output by a factor of 2. That is one of each two samples is deleted. The downsampler 12 supplies a downsampled version of the lowpass filtered version with a rate of $f_{s1}/2$, which is 96 kHz to the input 18 of the combination unit 20 and to the input of the upsampler 22. The upsampler 22 upsamples the signal applied to its input by a factor of 2 in the present example, so that it restores the sample rate to $f_{s1}$.

The filter unit 28 has the function to predict at least the low frequency component of the digital information signal supplied to the input terminal 1, in response to the signal applied to its input 26. The subtractor unit 34 subtracts the low frequency component generated by the prediction filter unit 28 from the wideband digital information signal supplied to the input 26. As a result, only the high frequency component of the digital information signal appears at the output 38 of the subtractor unit 34 as the difference signal.

The high frequency component of the digital information signal generally has a low information content, so that a relatively small portion of the bandwidth of the transmission medium is required to transmit the high frequency component.

If the filter unit 28 is in an adaptive predictive form, the filter unit 28 is moreover meant to generate a prediction of the digital information signal itself. To realize such functioning, the filter unit 28 requires information about the digital information signal itself to generate such prediction, or requires information about the difference signal, for the reason to make the difference signal minimal. The difference signal thus obtained has an even smaller information content.

As has been said earlier, if the filter unit 28 is an adaptive prediction filter, the filter calculates its own filter coefficients and supplies the filter coefficients (in any form) to its output 48 and thus to the input 50 of the signal combination unit 20.

The combination unit 20 combines the signal applied to its inputs into a serial data stream suitable for transmission via the transmission medium TRM. From a more detailed description of the signal combination unit 20 will be refrained with, as the functioning of the signal combination unit 20 is well known in the art.

The transmission medium TRM can be a broadcast channel or a record carrier, such as a magnetic or an optical record carrier. The transmission signal is transmitted via the transmission medium TRM to a receiver.

Figure 2:
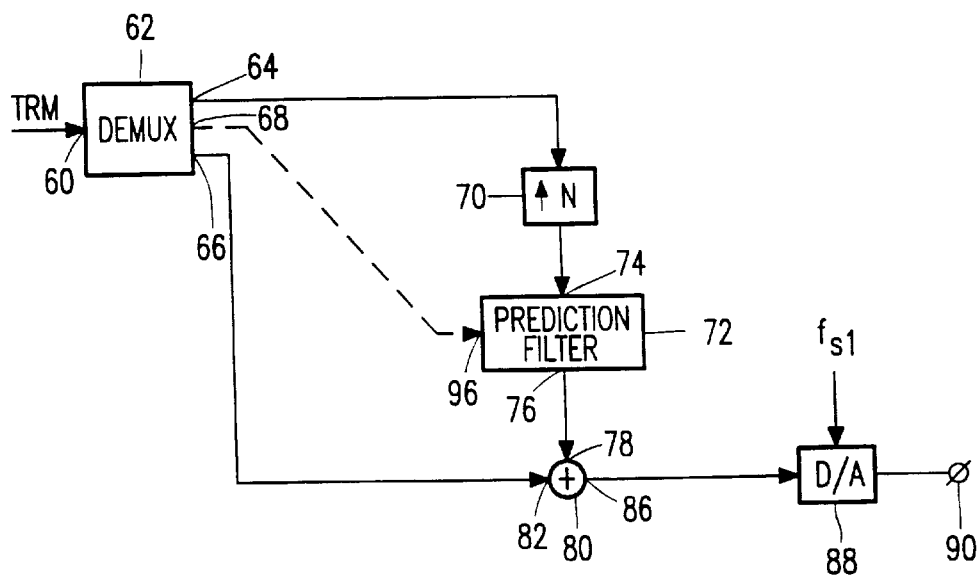
FIG. 2 shows a first embodiment of the receiver.

FIG. 2 shows an embodiment of a receiver for receiving the transmission signal and regenerating therefrom a replica of the original digital information signal.

The transmission signal TRM is received via the input 60 of a demultiplexer unit 62. The demultiplexer unit 62 is capable of retrieving the lowpass filtered and downsampled version of the digital information signal from the transmission signal and supplies this signal, which as a sample rate $f_{s2}$, which is 96 kHz to an upsampler 70. The upsampler 70 upsamples the signal supplied to its input by a factor of 2, so that it restores the sample rate of the signal to $f_{s1}$. The signal thus obtained is supplied to an input of a filter unit 72. The output 76 of the filter unit 72 is coupled to a first input 78 of a signal combination unit 80 which is in the form of an adder unit.

Another output 66 of the demultiplexer unit 62 is coupled to a second input 82 of the adder unit 80. The demultiplexer unit 62 is capable of retrieving the difference signal from the transmission signal and to supply the signal so retrieved to the output 66. An output 86 of the adder unit 80 is coupled to an output 90 of the receiver, if required via a D/A converter 88. The receiver may in addition be provided with a second D/A converter, not shown, which has an input coupled to the output 64 of the demultiplexer unit 62 and an output coupled to another output terminal, not shown.

The functioning of the receiver of FIG. 2 is as follows. The demultiplexer unit 62 retrieves the downsampled low frequency component of the digital information signal and supplies this signal at the output 64.

The downsampled low frequency component having the sampling rate $f_{s2}$ is supplied to the upsampler unit 70. The upsampler unit 72 upsamples the signal applied to its input again by a factor of 2, by adding a zero-valued sample in between each two subsequent samples of the signal supplied to its input. The signal generated at its output now has a sampling rate of $f_{s1}$.

The filter unit 72, in the same way as the filter unit 28 of the transmitter, has the function to predict at least the low frequency component of the original digital information signal in response to the signal applied to its input. The signal thus obtained and having a sampling rate of $f_{s1}$ is supplied to the input 78 of the adder unit 80.

If the filter unit 72 is an adaptive prediction filter, it requires filter coefficients to set the filter to its proper shape. In such an embodiment of the receiver, the demultiplexer unit 62 is also capable of retrieving the filter coefficients, as generated by the prediction filter 28 of the transmitter, from the transmission signal and to supply the coefficients to an output 68, which is coupled to an input 96 of the prediction filter 72.

The demultiplexer unit 62 is also capable of retrieving the difference signal, which relates to the high frequency component of the digital information signal, from the transmission signal and to supply the difference signal to the input 82 of the adder unit 80. The adder unit 80 combines the signal components supplied to its input 78 and 82 and supplies a replica of the original digital information signal to its output 86 with a sampling rate $f_{s1}$. The D/A converter 88 which may be present, is controlled by the frequency $f_{s1}$, and converts the replica of the digital information signal into an analog signal having a bandwidth of $f_{s1}/2$.

Figure 3:
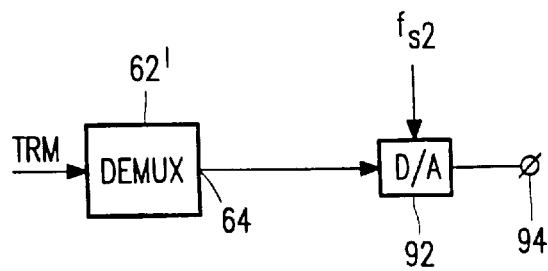
FIG. 3 shows a prior art receiver for receiving the transmission signal generated by the transmitter of FIG. 1.

A prior art receiver, shown in FIG. 3, is provided with a demultiplexer unit 62' which is capable of retrieving the low frequency component of the digital information signal, having the sampling frequency $f_{s2}$, from the transmission signal transmitted via the transmission medium TRM. The receiver has a D/A converter 92, which is controlled by a frequency $f_{s2}$, so that analog version of the low frequency component of the digital information signal, having a bandwidth of $f_{s2}/2$ is supplied to the output 94.

Figure 4:
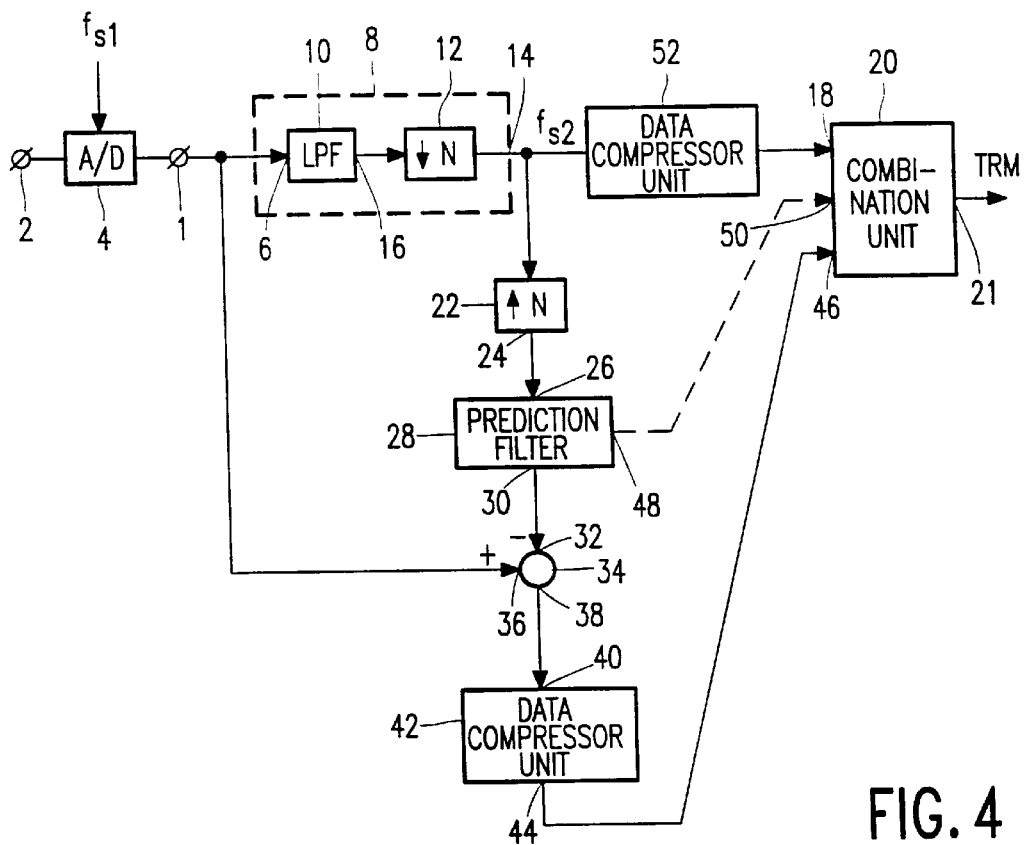
FIG. 4 shows a second embodiment of the transmitter.

FIG. 4 shows another embodiment of the transmitter. The transmitter of FIG. 4 shows a large resemblance with the transmitter of FIG. 1. In addition to the elements shown in FIG. 1, the transmitter of FIG. 4 shows a data compression unit 42 coupled between the output of the subtractor unit 34 and the input 46 of the combination unit 20. The data compression unit 42 realises a data compression on the signal applied to its input so as to obtain a data compressed difference signal of an even lower data content.

Figure 6:
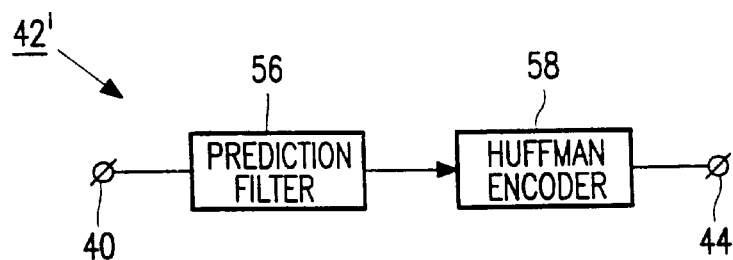
FIG. 6 shows another embodiment of a data compression unit of the transmitter.

The data compressor unit 42 may comprise an entropy encoder, such as a Huffmann encoder, well known in the art. In another elaboration of the data compression unit 42, shown in FIG. 6, the compression unit 42' comprises a prediction filter 56 and a Huffmann encoder 58.

The data compression realized in the compression unit 42 or 42', as described above, is known under the name of lossless compression.

The transmitter may further be provided with a data compression unit 52 coupled between the output 14 of the filter unit 8 and the input 18 of the combination unit 20, so as to realise a data compression on the down sampled low frequency component of the digital information signal.

The data compressor unit 52 may comprise an entropy encoder, such as a Huffmann encoder, well known in the art, or the combination of a prediction filter and a Huffmann encoder, as discussed above with reference to FIG. 6.

Figure 5:
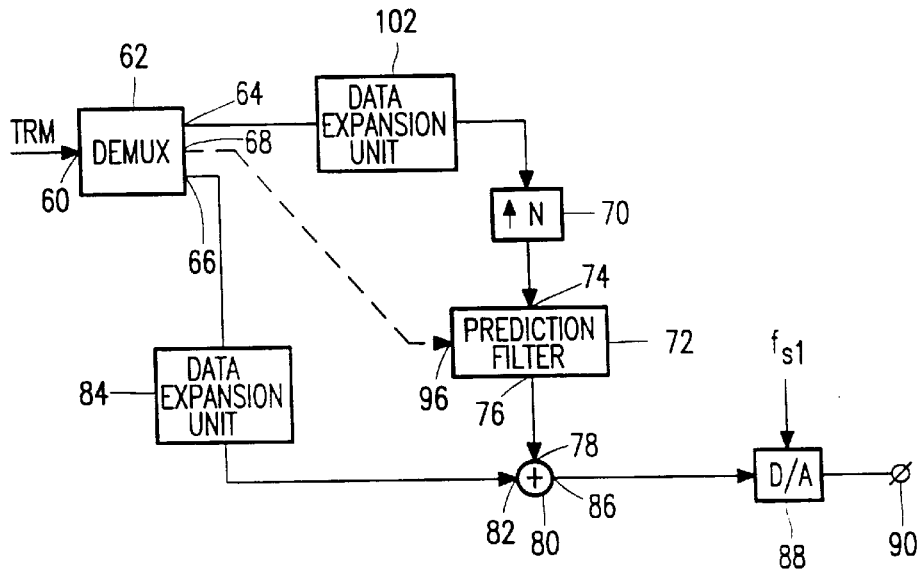
FIG. 5 shows a second embodiment of the receiver.

FIG. 5 shows another embodiment of the receiver. The receiver of FIG. 5 shows a large resemblance with the receiver of FIG. 2. In addition to the elements shown in FIG. 2, the receiver of FIG. 5 shows a data expansion unit 84 coupled between the output 66 of the demultiplexer unit 62 and the input 82 of the adder unit 80. The data expansion unit 84 realises a data expansion on the signal applied to its input so as to obtain a data expanded difference signal.

Figure 7:
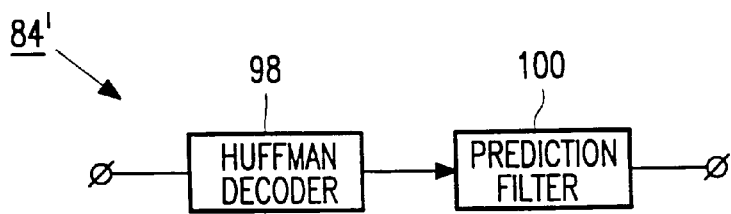
FIG. 7 shows another embodiment of a data expansion unit of the receiver.

The data expansion unit 84 may comprise an entropy decoder, such as a Huffmann decoder, well known in the art. In another elaboration of the data expansion unit 84, shown in FIG. 7, the expansion unit 84' comprises a Huffmann decoder 98 and a prediction filter 100.

The receiver may further be provided with a data expansion unit 102 coupled between the output 64 of the demultiplexer unit 62 and the input of the upsampler 70, so as to realise a data expansion on the data compressed down sampled low frequency component of the digital information signal.

The data expansion unit 102 may comprise an entropy decoder, such as a Huffmann decoder, well known in the art, or the combination of a Huffmann decoder and a prediction filter, as discussed above with reference to FIG. 7.

Figure 8:
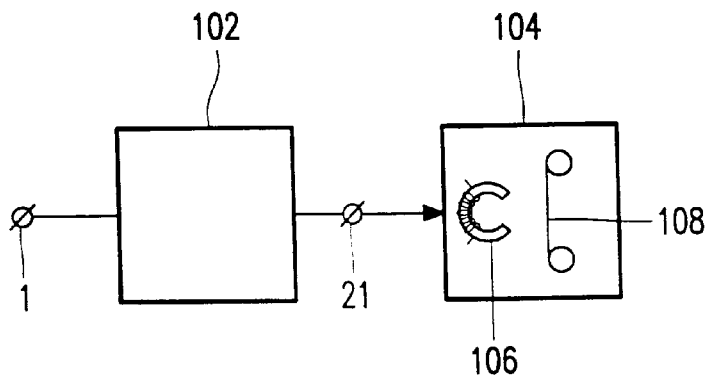
FIG. 8 shows a transmitter in the form of a recording apparatus.

FIG. 8 shows the transmitter in the form of an apparatus for recording the digital information signal on a record carrier. The circuit block denoted 102 in FIG. 8 replaces the circuit diagrams of FIG. 1 or FIG. 4. The input terminal 1 of the recording apparatus of FIG. 8 is thus equivalent to the input terminal 1 in the FIGS. 1 and 4, and the terminal 21 in FIG. 8 is equivalent to the output 21 of the signal combination unit 20 in the FIGS. 1 and 4. The recording apparatus further comprises writing means 104 for writing the output signal present at the terminal 21 on the record carrier 108. The record carrier 108 can be of the magnetic type. In that case, the writing means 104 comprise one or more magnetic heads 106 for writing the information in a track on the record carrier. In another embodiment, the record carrier 108 is an optical record carrier. The writing means now comprise an optical write head for writing the information in a track on the record carrier. The writing means 104 generally comprise a channel encoding unit, for channel encoding the signal to be recorded, prior to recording.

Figure 9:
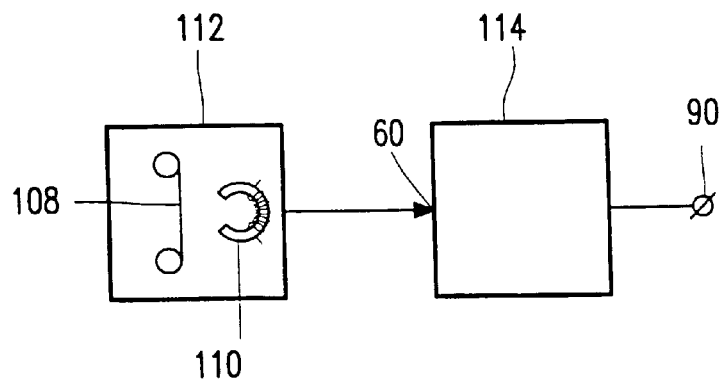
FIG. 9 shows a receiver in the form of a reproducing apparatus.

FIG. 9 shows the receiver in the form of an apparatus for reproducing the digital information signal from the record carrier. The circuit block denoted 114 in FIG. 9 replaces the circuit diagrams of FIG. 2 or FIG. 5. The terminal 60 of the reproducing apparatus of FIG. 9 is thus equivalent to the input 60 of the demultiplexer unit 62 in the FIGS. 2 and 5, and the output terminal 90 in FIG. 9 is equivalent to the output terminal 90 of the receiver of the FIGS. 2 and 5. The reproducing apparatus further comprises reading means 112 for reading the signal recorded on the record carrier 108 and for supplying the signal read out to the input 60. The record carrier 108 can be of the magnetic type. In that case, the reading means 112 comprise one or more magnetic heads 10 for reading the information from a track on the record carrier. In another embodiment, the record carrier 108 is an optical record carrier. The reading means 112 now comprise an optical read head for reading the information from a track on the record carrier. The reading means 112 generally comprise a channel decoding unit for channel decoding the signal read from the record carrier, prior to further processing the said signal.

The measures in accordance with the invention described above, fall under the general name of frequency scalability, in the sense that Output signals of different frequency ranges can be retrieved upon reception.

Whilst the invention has been described with reference to preferred embodiments thereof, it is to be understood that these are not limitative examples. Thus, various modifications may become apparent to those skilled in the art, without departing from the scope of the invention, as defined by the claims.

Further, the invention lies in each and every novel feature or combination of features.

I claim:

1. Transmitter for transmitting a digital information signal having a specific first sampling frequency via a transmission medium, the transmitter comprising
   input means for receiving the digital information signal having the specific first sampling frequency,
   first filter means for lowpass filtering and downsampling the digital information signal, so as to obtain a lowpass filtered version of the digital information signal, having a specific second sampling frequency which is smaller than the first sampling frequency,
   second filter means for carrying out a signal processing on the digital information signal which is equivalent to the signal processing carried out on the digital information signal by the first filter means, followed by tipsampling the lowpass filtered version of the digital information signal having the specific second sampling frequency, so as to obtain an upsampled version of the digital information signal having a specific third sampling frequency which is substantially equal to the first sampling frequency,
   third filter means for carrying out a filtering on the upsampled version of the digital information signal so as to obtain a second filtered version of the digital information signal,
   first signal combination means for combining the digital information signal and the second filtered version of the digital information signal so as to obtain a difference signal,
   second signal combination means for combining the lowpass filtered version of the digital information signal and the difference signal so as to obtain a transmission signal for transmission via the transmission medium.

2. Transmitter as claimed in claim 1, characterized in that data compression means (42) are provided for data compressing the difference signal so as to obtain a data compressed difference signal, the second signal combination means being adapted to combine the lowpass filtered version of the digital information signal and the data compressed difference signal so as to obtain said transmission signal for transmission via the transmission medium.

3. Transmitter as claimed in claim 1, characterized in that data compression means are provided for data compressing the lowpass filtered version of the digital information signal so as to obtain a data compressed lowpass filtered version of the digital information signal, the second signal combination means being adapted to combine the data compressed lowpass filtered version of the digital information signal and the difference signal (if so, data compressed) so as to obtain said transmission signal for transmission via the transmission medium.

4. Transmitter as claimed in claim 1, wherein the third filter means are adaptive prediction filter means.

5. Transmitter as claimed in claim 4, wherein the adaptive prediction filter means are adapted to generate prediction filter coefficients, the second combination means (20) being further adapted to combine the prediction filter coefficients so as to obtain said transmission signal.

6. Transmitter as claimed in claim 2, wherein the data compression means comprises entropy encoding means.

7. Transmitter as claimed in claim 2, wherein the data compression means comprises second prediction filter means and entropy encoding means.

8. Transmitter as claimed in claim 6, wherein said entropy encoding means is in the form of a Huffman encoder.

9. Transmitter as claimed in claim 1, wherein said first sampling frequency is 192 kHz and said second sampling frequency is 96 kHz.

10. Transmitter as claimed in claim 1, the transmitter being in the form of an apparatus for recording the digital information signal on a record carrier.

11. Record carrier obtained with the transmitter as claimed in claim 10.

12. Record carrier as claimed in claim 11, wherein the record carrier is of the optical or magnetic recording type.

13. Receiver for receiving a transmission signal from a transmission medium and generating a digital information signal therefrom having a first sampling frequency, the transmission signal being generated by the transmitter as claimed in claim 1, the receiver comprising
   retrieval means for retrieving the transmission signal from the transmission medium,
   demultiplexer means for deriving the lowpass filtered version of the digital information signal and the difference signal from the transmission signal,
   upsampling means for upsampling the lowpass filtered version of the digital information signal so as to obtain an upsampled version of the digital information signal having a specific third sampling frequency which is substantially equal to the first sampling frequency, filter means for carrying out a filtering on the upsampled version of the digital information signal so as to obtain a filtered version of the digital information signal, signal combination means for combining the filtered version of the digital information signal and the difference signal so as to obtain said digital information signal.

14. Receiver as claimed in claim 13, the demultiplexer means being adapted to retrieve a difference signal which is data compressed from the transmission signal, the receiver further being provided with data expansion means so as to obtain a difference signal which is data expanded.

15. Receiver as claimed in claim 13, the demultiplexer means being adapted to retrieve a lowpass filtered version of the digital information signal which is data compressed from the transmission signal, the receiver further being provided with data expansion means so as to obtain a lowpass filtered version of the digital information signal which is data expanded.

16. Receiver as claimed in claim 13, further comprising

D/A conversion means for D/A converting the digital information signal with the first sampling frequency.

17. Receiver as claimed in claim 13, wherein the filter means are adaptive prediction filter means.

18. Receiver as claimed in claim 17, wherein the demultiplexing means further being adapted to derive the filter coefficients for the adaptive prediction filter means from the transmission signal.

19. Receiver as claimed in claim 14, wherein the data expansion means comprises entropy decoding means.

20. Receiver as claimed in claim 14, wherein the data expansion means comprises entropy decoding means and second prediction filter means.

21. Receiver as claimed in claim 19, wherein said entropy decoding means comprise a Huffman decoder.

22. Receiver as claimed in claim 13, characterized in that it further comprises channel decoding means accommodated between the retrieval means and the demultiplexer means.

23. Transmitter as claimed in claim 1, characterized in that it further comprises channel encoding means for channel encoding the transmission signal prior to transmission.

24. Method of transmitting a digital information signal having a specific first sampling frequency via a transmission medium, the method comprising the steps of receiving the digital information signal having the specific first sampling frequency, lowpass filtering and downsampling the digital information signal, so as to obtain a lowpass filtered version of the digital information signal, having a specific second sampling frequency which is smaller than the first sampling frequency, carrying out a signal processing on the digital information signal which is equivalent to the signal processing carried out on the digital information signal in the lowpass filtering and down sampling step, followed by upsampling the lowpass filtered version of the digital information signal having the specific second sampling frequency, so as to obtain an upsampled version of the digital information signal having a specific third sampling frequency which is substantially equal to the first sampling frequency, carrying out a filtering on the upsampled version of the digital information signal so as to obtain a second filtered version of the digital information signal, combining the digital information signal and the second filtered version of the digital information signal so as to obtain a difference signal, combining the lowpass filtered version of the digital information signal and the difference signal so as to obtain a transmission signal for transmission via the transmission medium.

* * * * *